US009703146B2

(12) United States Patent
Wu et al.

(10) Patent No.: US 9,703,146 B2
(45) Date of Patent: Jul. 11, 2017

(54) LIQUID CRYSTAL DISPLAY PANEL AND PREPARATION METHOD THEREOF

(71) Applicant: InnoLux Corporation, Miao-Li County (TW)

(72) Inventors: Shih-Hsiung Wu, Miao-Li County (TW); Jui-Chu Lai, Miao-Li County (TW); Lung-Sheng Sun, Miao-Li County (TW); Chih-Hua Chang, Miao-Li County (TW)

(73) Assignee: INNOLUX CORPORATION, Taiwan (TW)

( * ) Notice: Subject to any disclaimer, the term of this patent is extended or adjusted under 35 U.S.C. 154(b) by 226 days.

(21) Appl. No.: 14/533,160

(22) Filed: Nov. 5, 2014

(65) Prior Publication Data
US 2015/0160486 A1    Jun. 11, 2015

(30) Foreign Application Priority Data
Dec. 5, 2013    (TW) .............................. 102144548 A

(51) Int. Cl.
*G02F 1/1341*    (2006.01)
*G02F 1/1339*    (2006.01)

(52) U.S. Cl.
CPC .......... *G02F 1/1339* (2013.01); *G02F 1/1341* (2013.01)

(58) Field of Classification Search
CPC ...... G02F 1/1341; G02F 1/1339; G02F 1/161; G02F 1/0107
See application file for complete search history.

(56) References Cited

U.S. PATENT DOCUMENTS

| 2004/0165127 A1* | 8/2004 | Lin ....................... G02F 1/1339 349/110 |
| 2004/0239864 A1* | 12/2004 | Asakawa .............. G02F 1/1339 349/153 |
| 2010/0002192 A1* | 1/2010 | Hara .................... A61B 3/0091 351/224 |
| 2010/0238098 A1* | 9/2010 | Watanabe ............. G02F 1/1339 345/87 |
| 2012/0327355 A1* | 12/2012 | Cheng ................... G02F 1/1341 349/153 |
| 2016/0147097 A1* | 5/2016 | Makino ................. G02F 1/1339 349/33 |

FOREIGN PATENT DOCUMENTS

CN    1991482 A    7/2007
JP    S58139125 A    8/1983

* cited by examiner

*Primary Examiner* — Mariceli Santiago
(74) *Attorney, Agent, or Firm* — Bacon & Thomas, PLLC

(57) ABSTRACT

The present invention relates to a liquid crystal display panel and a preparation method thereof. The liquid crystal display panel comprises: a first substrate having a display area and a sealant area, wherein the sealant area surrounds the display area; a second substrate; a liquid crystal layer disposed between the first substrate and the second substrate; and a sealant frame disposed on the sealant area of the first substrate, wherein the sealant frame includes a plurality of corner portions and a plurality of strip portions, wherein the adjacent strip portions intersect at one of the corner portions; and these corner portions includes a plurality of first corner portions and a plurality of second corner portions. Each of the first corner portion includes an arcuate peripheral edge adjacent to the display area, and each of the second corner portion includes an angular peripheral edge adjacent to the display area.

13 Claims, 6 Drawing Sheets

LIQUID CRYSTAL DISPLAY PANEL AND PREPARATION METHOD THEREOF

CROSS REFERENCE TO RELATED APPLICATION

This application claims the benefits of the Taiwan Patent Application Serial Number 102144548, filed on Dec. 5, 2013, the subject matter of which is incorporated herein by reference.

BACKGROUND OF THE INVENTION

1. Field of the Invention

The present invention relates to a liquid crystal display panel and a preparation method thereof and, more particularly, to a liquid crystal display panel with a narrow frame and a preparation method thereof.

2. Description of Related Art

As display techniques developed, the quality requirements therefor are also increased. For both portable display devices with small sizes and display devices with large sizes, shapes thereof are developed toward light weight and thin thickness. In addition, the display devices having high quality, low power consumption and no radiation are the mainstream in the display techniques.

For the display devices with small sizes such as mobile phones or tablets, it is desired to develop a display device which has the largest display area in the same penal size. One manner to achieve the aforementioned purpose is to reduce the size of the border area beyond a display area of the display devices.

During the currently used process for preparing a liquid crystal display device, a substrate is firstly coated with a sealant, and then liquid crystal cells are injected into the region defined by the sealant via one drop filling method after the sealant is cured. Herein, the region defined by the cured sealant is filled with the liquid crystal cells to be used as a display area. However, the currently used process for applying the sealant is a surround coating, and the formed sealant has an arcuate peripheral edge at the turning points due to the limitation of the turning radius of the used sealant coating machine. The arcuate peripheral edge of the formed sealant is close to the display area of the display device, and may further overlap with the display area thereof. In this case, the region of the display area thereof is reduced and the width of the border area with the sealant formed thereon is increased. Therefore, the requirement for narrow border area cannot be achieved, and sometimes the situation of sealant overflow may also be occurred.

Hence, it is desirable to provide a sealant and a method for dispensing the same for preparing a display device with narrow border area, in order to increase the region of the display area thereof and the tensile strength thereof.

SUMMARY OF THE INVENTION

The present invention provides a liquid crystal display panel, which comprises: a first substrate having a display area and a sealant area, wherein the sealant area surrounds the display area; a second substrate; a liquid crystal layer disposed between the first substrate and the second substrate; and a sealant frame disposed on the sealant area of the first substrate, wherein the sealant frame includes a plurality of corner portions and a plurality of strip portions, the adjacent strip portions intersect at one of the corner portions, and the corner portions includes a plurality of first corner portions and a plurality of second corner portions; wherein each of the first corner portion includes an arcuate peripheral edge adjacent to the display area, and each of the second corner portion includes an angular peripheral edge adjacent to the display area, wherein a distance between the display area and the strip portion simultaneously connected to two of the first corner portions is larger than that between the display area and the strip portion simultaneously connected to the first corner portion and the second corner portion.

In one aspect of the present invention, the liquid crystal display panel further comprises at least one spacer disposed on the first substrate or the second substrate and located between the display area and one of the second corner portions.

In one aspect of the present invention, the first substrate includes at least one slit corresponding to one of the second corner portions.

Another aspect of the present invention is to provide a liquid crystal display panel, comprising: a first substrate having a display area and a sealant area, wherein the sealant area surrounds the display area; a second substrate; a liquid crystal layer disposed between the first substrate and the second substrate; and a sealant frame disposed on the sealant area of the first substrate, wherein the sealant frame includes a plurality of corner portions and a plurality of strip portions, the adjacent strip portions intersect at one of the corner portions, and the corner portions includes a plurality of first corner portions and a plurality of second corner portions; wherein each of the first corner portion includes an arcuate peripheral edge adjacent to the display area, and each of the second corner portion includes an angular peripheral edge adjacent to the display area, wherein a distance between the display area and the strip portion simultaneously connected two of the first corner portions is larger than that between the display area and the strip portion simultaneously connected two of the second corner portions.

Another aspect of the present invention is to provide a preparation method of a liquid crystal display panel, which comprises: (A) providing a first substrate having a display area and a sealant area surrounding the display are, wherein the display area has a first edge and a second edge connecting to the first edge; (B) applying a first sealant on the sealant area along the first edge of the display area to form a plurality of strip portions and a plurality of first corner portions connecting the adjacent strip portions; (C) applying a second sealant on the sealant area along the second edge of the display area to form at least one strip portion; and (D) laminating a second substrate on the first substrate to dispose the first sealant and the second sealant between the first substrate and the second substrate, wherein the first sealant and the second sealant intersect to form two second corner portions, each first corner portion respectively includes an arcuate peripheral edge adjacent to the display area, and each second corner portion respectively includes an angular peripheral edge adjacent to the display area.

In one aspect of the preparation method of a liquid crystal display panel of the present invention, the step (C) is performed before the step (B).

In one aspect of the preparation method of a liquid crystal display panel of the present invention, the preparation method further comprises: a step (E) after the step (D): cutting the first substrate and the second substrate along with the strip portions connecting to the two second corner portions.

In one aspect of the preparation method of a liquid crystal display panel of the present invention, the angular peripheral edge includes a first peripheral edge and a second peripheral edge, and an angle included between the first peripheral edge and the second peripheral edge is substantially 90°.

In one aspect of the preparation method of a liquid crystal display panel of the present invention, the preparation method further comprises a step (C1) after the step (C): disposing a liquid crystal layer between the first substrate and the second substrate:

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

Figure 1:
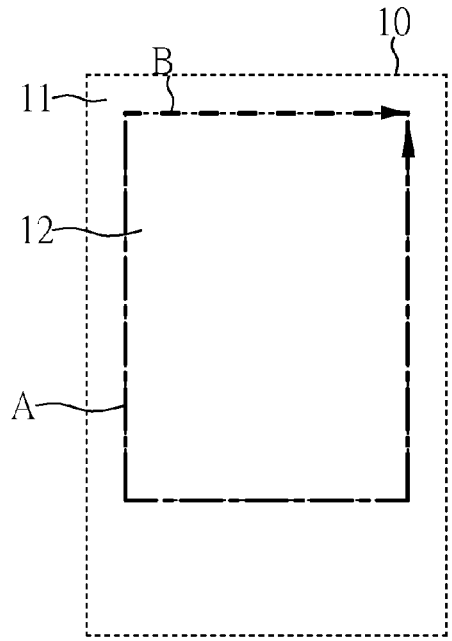
FIGS. 1~5 are perspective views showing a preparation method of a liquid crystal display according to Embodiment 1 of the present invention.

FIGS. 1~4 are perspective views showing a preparation method of a liquid crystal display of the present embodiment. As shown in FIG. 1, a first substrate 10 is provided, which has a display area 12 and a sealant area 11 surrounding the display area 12. The display area 12 has a first edge A and a second edge B connecting to the first edge A. The widths of three sides of the sealant area 11 are respectively smaller than that of the remaining side thereof. However, in other embodiment, the widths of the sides of the sealant area 11 can be adjusted according to the shapes and the signal routings of desired display device. Preferably, the width of the side disposing with a driver IC (not shown in the figure) of the sealant area 11 is larger than those of the remaining sides thereof.

Figure 2:
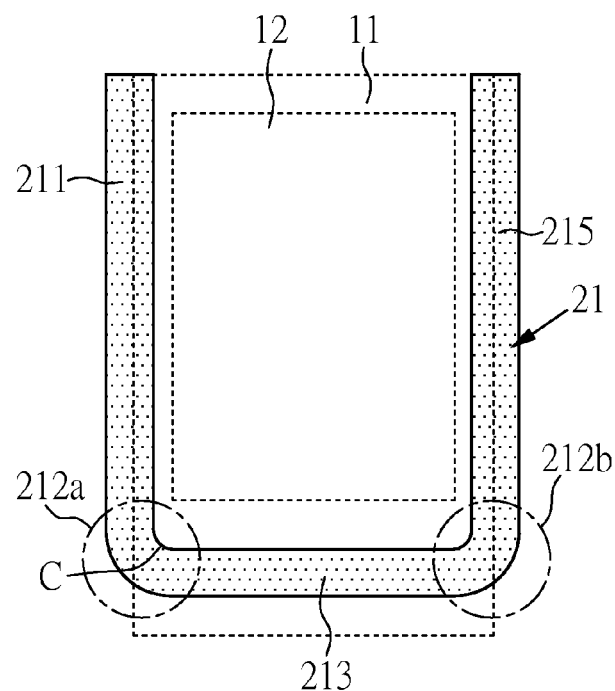

Next, a sealant is applied onto the sealant area 11 along the first edge A of the display area 12 to form a first sealant 21 containing three strip portions and two first corner portions, as shown in FIG. 2. Herein, the first sealant 21 comprises a first strip portion 211, a second strip portion 213, a third strip portion 215, a first corner portion 212a locating between the first strip portion 211 and the second strip portion 213, and a first corner portion 212b locating between the second strip portion 213 and the third strip portion 215. Since the first sealant 21 is applied onto the first substrate 10 through a continuous coating manner, the two first corner portions 212a, 212b respectively include an arcuate peripheral edge C adjacent to the display area 12 at the turning points due to the limitation of the turning radius of the used sealant coating machine and the viscosity of the applied sealant.

Figure 3:
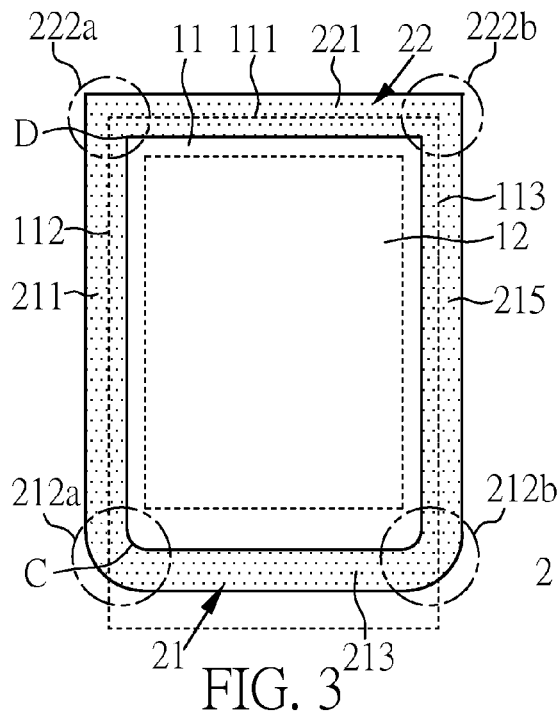

Furthermore, a sealant is applied onto the sealant area 11 along the second edge B of the display area 12 to form a second sealant 22, as shown in FIG. 3. The second sealant 22 comprises a fourth strip portion 221, and intersects with the first strip portion 211 and the third strip portion 215 of the first sealant 21 to form two second corner portions 222a, 222b, in which the second corner portions 222a, 222b respectively include angular peripheral edges D adjacent to the display area 12. The angular peripheral edges D is formed with a first peripheral edge and a second peripheral edge, and an angle included between the first peripheral edge and the second peripheral edge is substantially 90°.

Figure 4:
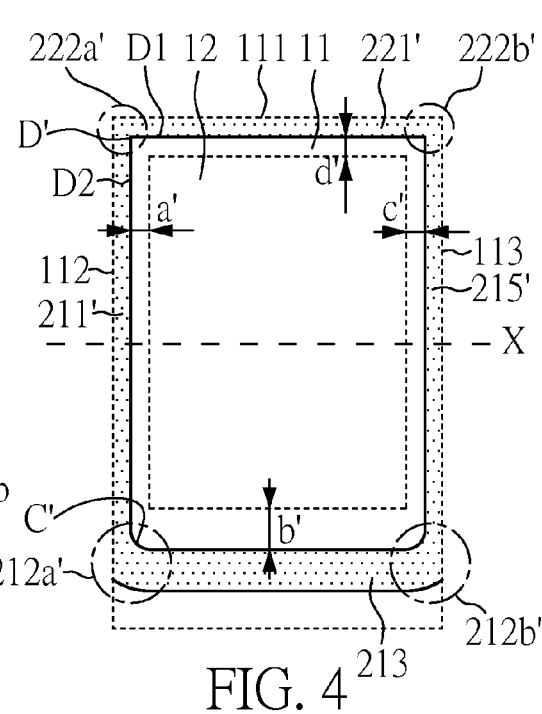
Figure 5:
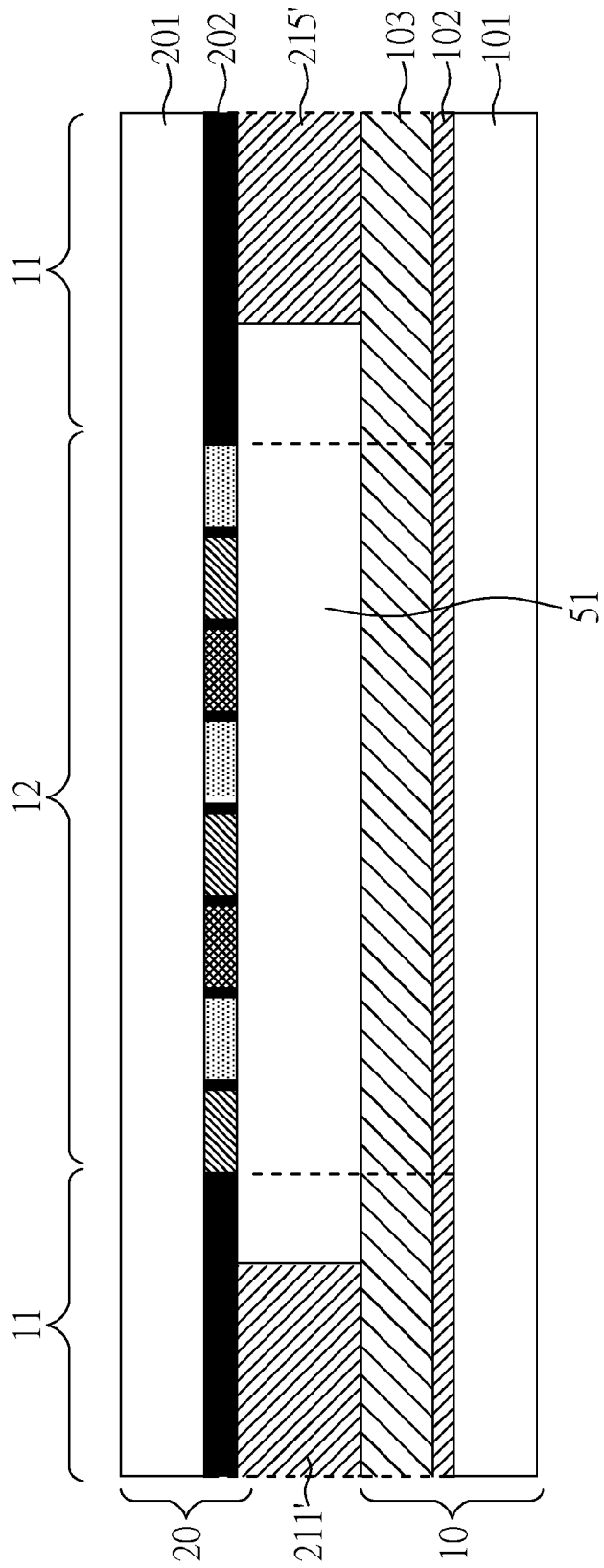

Next, as shown in FIGS. 3~5, a second substrate 20 is laminated onto the first substrate 10, the first sealant 21 and the second sealant 22 locate between the first substrate 10 and the second substrate 20, and a liquid crystal layer 51 is disposed in the display area 12 and also between the first substrate 10 and the second substrate 20. Then, the first substrate 10 and the second substrate 20 are cut along three sides 111, 112, 113 of the sealant area 11 as well as the first strip portion 211, the third strip portion 215 and the fourth strip portion 221 formed thereon to obtain the sealant pattern as shown in FIG. 4.

As shown in FIG. 4, the obtained sealant frame comprises a first strip portion 211', the second strip portion 213, a third strip portion 215' and a fourth strip portion 221'. In addition, as shown in FIG. 4, the first strip portion 211' is apart from the display area 12 in a distance a', the third strip portion 215' is apart therefrom in a distance c', the fourth strip portion 221' is apart therefrom in a distance d', and the second strip portion 213 is apart therefrom in a distance b'. Furthermore, the obtained sealant frame also comprises two first corner portions 212a', 212b' and two second corner portions 222a', 222b'. The first corner portion 212a' locates between the first strip portion 211' and the second strip portion 213, the first corner portion 212b' locates between the third strip portion 215' and the second strip portion 213, and the two first corner portions 212a', 212b' respectively includes an arcuate peripheral edge C' adjacent to the display area 12. The second corner portion 222a' locates between the first strip portion 211' and the fourth strip portion 221', the second corner portion 222b' locates between the third strip portion 215' and the fourth strip portion 221', the two second corner portions 222a', 222b' respectively includes an angular peripheral edge D' adjacent to the display area 12, the angular peripheral edge D' is formed with a first peripheral edge D1 and a second peripheral edge D2, and an angle included between the first peripheral edge D1 and the second peripheral edge D2 is substantially 90°.

In addition, the second strip portion 213 simultaneously connected to the first corner portions 212a', 212b' is apart from the display area 12 in a distance b', which is larger than the distance a' between the display area 12 and the first strip portion 211' simultaneously connected to the first corner portion 212a' and the second corner portion 222a', the distance c' between the display area 12 and the third strip portion 215' simultaneously connected to the first corner portion 212b' and the second corner portion 222b', and the distance d' between the display area 12 and the fourth strip portion 221' simultaneously connected to the second corner portions 222a', 222b'.

FIG. 5 is a cross-sectional view of a liquid crystal display panel of the present embodiment according to the line X shown in FIG. 4. In the present embodiment, the first substrate 10 is a thin film transistor array substrate (TFT array substrate) comprising a bottom substrate 101, a TFT array unit 102 and a protection layer 103. However, in other embodiment of the present invention, the first substrate 10 can be any other substrate with active units formed thereon. In addition, in the present embodiment, the second substrate 20 is a color filter substrate including RGB units 202 and an upper substrate 201. However, in other embodiment of the present invention, the second substrate 20 may be a counter substrate further with a black matrix or a common electrode.

Embodiment 2

Figure 6:
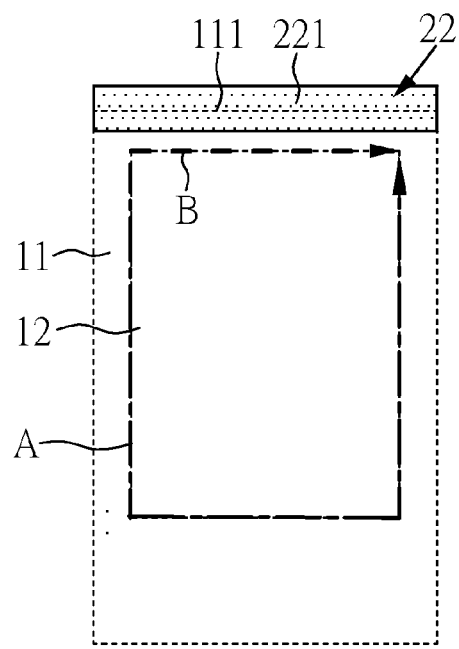
FIGS. 6~7 are perspective views showing a preparation method of a liquid crystal display according to Embodiment 2 of the present invention.
Figure 7:
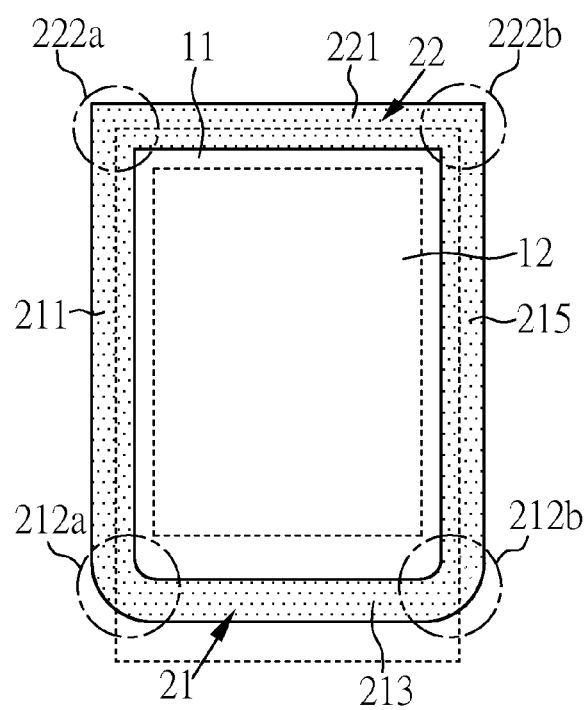

The preparation method of a liquid crystal display panel of the present embodiment is similar to that illustrated in Embodiment 1, except that the order for forming the first sealant 21 and the second sealant 22 is reversed in the present embodiment. As shown in FIG. 6, a sealant is firstly applied onto the sealant area 11 along the second edge B of the display area 12 to form a second sealant 22 as a fourth strip portion 221. Next, as shown in FIG. 7, a sealant is applied onto the sealant area 11 along the first edge A of the display area 12 to form a first sealant 21 containing three strip portions and two first corner portions. After the aforementioned steps, the obtained sealant comprises a first strip portion 211, a second strip portion 213, a third strip portion 215, a fourth strip portion 221, a first corner portion 212a locating between the first strip portion 211 and the second strip portion 213, a first corner portion 212b locating between the second strip portion 213 and the third strip portion 215, and two second corner portions which is formed by the first strip portion 211 and the third strip portion 215 of the first sealant 21 intersecting with the fourth strip portion 221 of the second sealant 22, wherein two second corner portions comprises a second corner portion 222a locating between the first strip portion 211 and the fourth strip portion 221, and a second corner portion 222b locating between the third strip portion 215 and the fourth strip portion 221. Next, the sealant frame shown in FIG. 4 and then the liquid crystal display panel shown in FIG. 5 are sequentially obtained by the same process illustrated in Embodiment 1.

Furthermore, during the process for forming the display panel, the applied sealant may overflow during the step for laminating the first substrate 10 and the second substrate 20 when the amount of the applied sealant is too much. In this case, the display quality of the display area 12 may be deteriorated, resulting in the reliability of the panel decreased. In addition, in the liquid crystal display panel of the present invention, the second corner portions 222a, 222b are formed by the first sealant 21 intersecting with the second sealant 22, so the situation that the large amount of the applied sealant results in the overflow of the sealant during the lamination process may be occurred at the second corner portions 222a, 222b.

Figure 8:
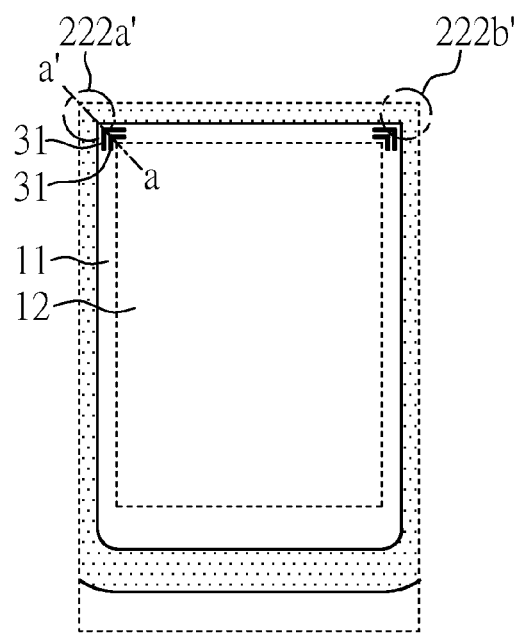
FIGS. 8~9 are perspective views of a liquid crystal display according one preferred embodiment of the present invention.
Figure 9:
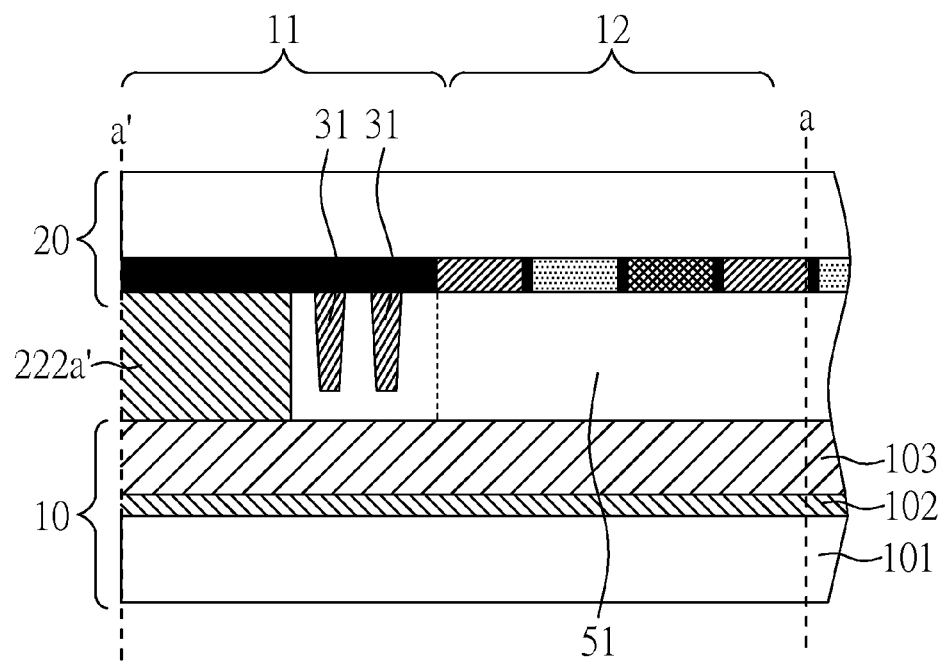

In order to solve the aforementioned problem of the sealant overflow, one or more spacer 31 may be disposed on the second substrate 20 in the display panel of Embodiment 1 or 2, as shown in FIGS. 8~9, wherein FIG. 9 is a cross-sectional view of the display panel of FIG. 8 along the a'-a line. As shown in FIGS. 8~9, the spacers 31 are disposed in the sealant area 11 and between the second corner portions 222a', 222b' of the sealant frame and the display area 12, to abolish the sealant overflowing into the display area 12 during the lamination process. However, in other embodiment, the shapes of the spacers 31 are not particularly limited, as long as those can abolish the sealant overflow. In addition, the spacers 31 may be disposed on the first substrate 10.

Figure 10:
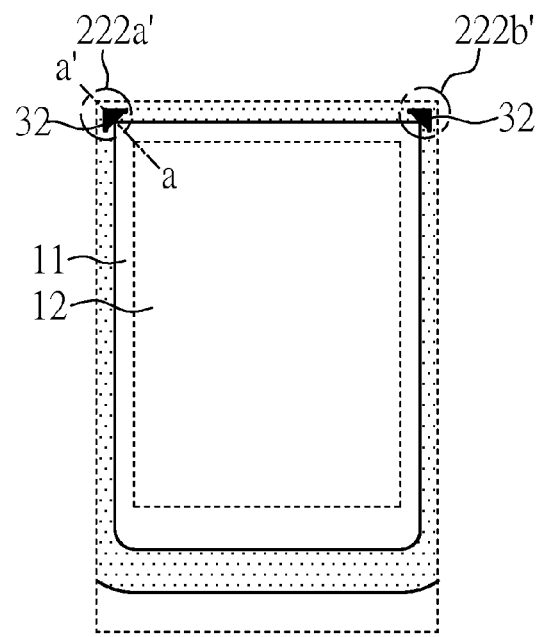
FIGS. 10~11 are perspective views of a liquid crystal display according another preferred embodiment of the present invention.
Figure 11:
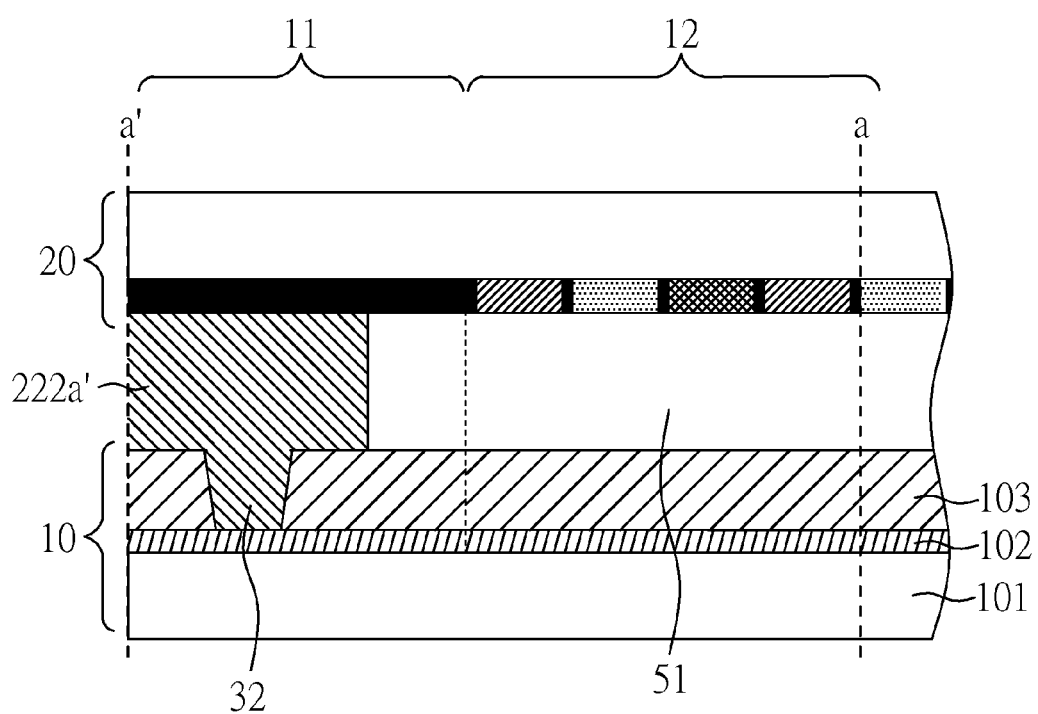

Furthermore, the first substrate 10 may include a slit 32 in the display panel of Embodiment 1 or 2, as shown in FIGS. 10~11, wherein FIG. 11 is a cross-sectional view of the display panel of FIG. 10 along the a'-a line. The slit 32 is disposed on the first substrate 10 and corresponds to the second corner portions 222a', 222b'. In this case, the redundant sealant can fill the slit 32 to prevent the sealant overflowing into the display area 12, during the lamination process. As shown in FIG. 10, the slit 32 has a triangle form. However, in other embodiment of the present invention, the shape of the slit 32 is not particularly limited, as long as it can achieve the purpose of preventing the sealant overflow. In addition, the slit 32 may be formed on the second substrate 20.

Figure 12:
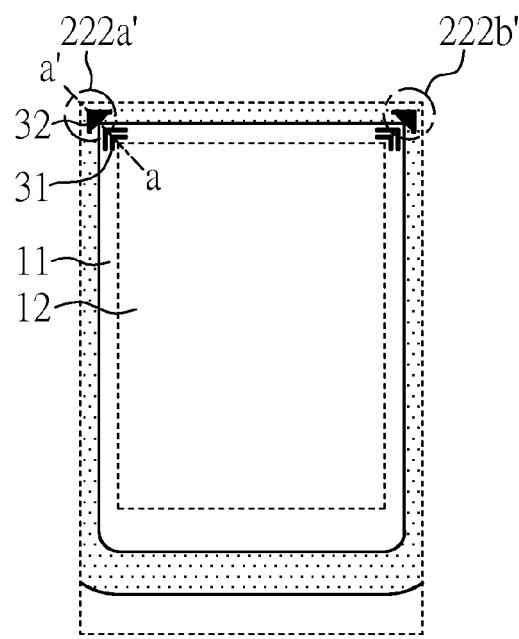
FIGS. 12~13 are perspective views of a liquid crystal display according further another preferred embodiment of the present invention.
Figure 13:
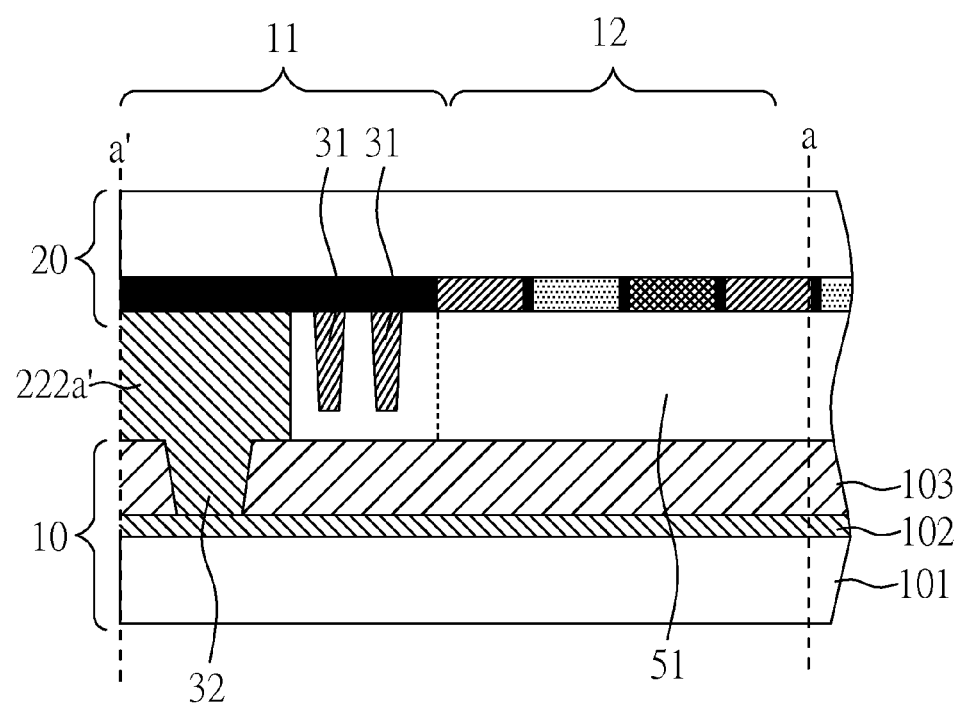

In other embodiment of the present invention, the display panel of the present invention may comprise one or more spacers 31 and slits 32 at the same time, as shown in FIGS. 12~13, wherein FIG. 13 is a cross-sectional view of the display panel of FIG. 12 along the a'-a line. Herein, the spacers 31 are disposed on the second substrate 20, between the second corner portions 222a', 222b' of the sealant frame and the display area 12, and in the sealant area 11. In addition, the slit 32 is disposed on the first substrate 10 and corresponds to the second corner portions 222a', 222b'.

Although the present invention has been explained in relation to its preferred embodiment, it is to be understood that many other possible modifications and variations can be made without departing from the spirit and scope of the invention as hereinafter claimed.

What is claimed is:

1. A liquid crystal display panel, comprising:
    a first substrate having a display area and a sealant area, wherein the sealant area surrounds the display area;
    a second substrate;
    a liquid crystal layer disposed between the first substrate and the second substrate; and
    a sealant frame disposed on the sealant area of the first substrate, wherein the sealant frame includes a plurality of corner portions and a plurality of strip portions, the adjacent strip portions intersect at one of the corner portions, and the corner portions includes a plurality of first corner portions and a plurality of second corner portions; wherein each of the first corner portion includes an arcuate peripheral edge adjacent to the display area, and each of the second corner portion includes an angular peripheral edge adjacent to the display area,
    wherein a distance between the display area and the strip portion simultaneously connected to two of the first corner portions is larger than that between the display area and the strip portion simultaneously connected to the first corner portion and the second corner portion.

2. The liquid crystal display panel as claimed in claim 1, wherein the angular peripheral edge includes a first peripheral edge and a second peripheral edge, and an angle included between the first peripheral edge and the second peripheral edge is substantially 90°.

3. The liquid crystal display panel as claimed in claim 1, further comprising at least one spacer disposed on the first substrate or the second substrate and located between the display area and one of the second corner portions.

4. The liquid crystal display panel as claimed in claim 1, wherein the first substrate includes at least one slit corresponding to one of the second corner portions.

5. A preparation method of a liquid crystal display panel, comprising the following steps:
- (A) providing a first substrate having a display area and a sealant area surrounding the display area, wherein the display area has a first edge and a second edge connecting to the first edge;
- (B) applying a first sealant on the sealant area along the first edge of the display area to form a plurality of strip portions and a plurality of first corner portions connecting the adjacent strip portions;
- (C) applying a second sealant on the sealant area along the second edge of the display area to form at least one strip portion; and
- (D) laminating a second substrate on the first substrate to dispose the first sealant and the second sealant between the first substrate and the second substrate, wherein the first sealant and the second sealant intersect to form two second corner portions, each first corner portion respectively includes an arcuate peripheral edge adjacent to the display area, and each second corner portion respectively includes an angular peripheral edge adjacent to the display area, and wherein a distance between the display area and the strip portion simultaneously connected to two of the first corner portions is larger than that between the display area and the strip portion simultaneously connected to the first corner portion and the second corner portion.

6. The preparation method as claimed in claim 5, wherein the step (C) is performed before the step (B).

7. The preparation method as claimed in claim 5, further comprising a step (E) after the step (D): cutting the first substrate and the second substrate along with the strip portions connecting to the two second corner portions.

8. The preparation method as claimed in claim 5, wherein the angular peripheral edge includes a first peripheral edge and a second peripheral edge, and an angle included between the first peripheral edge and the second peripheral edge is substantially 90°.

9. The preparation method as claimed in claim 5, further comprising a step (C1) after the step (C): disposing a liquid crystal layer between the first substrate and the second substrate.

10. A liquid crystal display panel, comprising:
- a first substrate having a display area and a sealant area, wherein the sealant area surrounds the display area;
- a second substrate;
- a liquid crystal layer disposed between the first substrate and the second substrate; and
- a sealant frame disposed on the sealant area of the first substrate, wherein the sealant frame includes a plurality of corner portions and a plurality of strip portions, the adjacent strip portions intersect at one of the corner portions, and the corner portions includes a plurality of first corner portions and a plurality of second corner portions; wherein each of the first corner portion includes an arcuate peripheral edge adjacent to the display area, and each of the second corner portion includes an angular peripheral edge adjacent to the display area, wherein a distance between the display area and the strip portion simultaneously connected two of the first corner portions is larger than that between the display area and the strip portion simultaneously connected two of the second corner portions.

11. The liquid crystal display panel as claimed in claim 10, wherein the angular peripheral edge includes a first peripheral edge and a second peripheral edge, and an angle included between the first peripheral edge and the second peripheral edge is substantially 90°.

12. The liquid crystal display panel as claimed in claim 10, further comprising at least one spacer disposed on the first substrate or the second substrate and located between the display area and one of the second corner portions.

13. The liquid crystal display panel as claimed in claim 10, wherein the first substrate includes at least one slit corresponding to one of the second corner portions.

* * * * *